United States Patent [19]

Aoki

[11] Patent Number: 6,069,763
[45] Date of Patent: May 30, 2000

[54] DATA RECORDING DEVICE

[75] Inventor: Shinji Aoki, Kanagawa, Japan

[73] Assignee: Sony Corporation, Tokyo, Japan

[21] Appl. No.: 08/968,134

[22] Filed: Nov. 12, 1997

[30] Foreign Application Priority Data

Nov. 18, 1996 [JP] Japan ................................ 8-306724

[51] Int. Cl.[7] ................................................ G11B 21/04
[52] U.S. Cl. ............................ 360/70; 360/8; 360/73.04; 360/73.08; 386/111; 386/112; 386/109
[58] Field of Search .................................... 360/70, 73.04, 360/73.08, 8; 386/109, 111–112

[56] References Cited

U.S. PATENT DOCUMENTS

| | | | |
|---|---|---|---|
| 4,656,529 | 4/1987 | Sakamoto | 386/109 |
| 5,349,479 | 9/1994 | Arimura et al. | 360/73.06 |
| 5,892,633 | 4/1999 | Ayres et al. | 360/73.08 |

*Primary Examiner*—Aristotelis M Psitos
*Assistant Examiner*—Dan I. Davidson
*Attorney, Agent, or Firm*—Jay H. Maioli

[57] ABSTRACT

A data recording device in which the data recording can be carried out at an optional speed without any loss of data using a buffer with less amount of memory. There are provided a memory buffer for storing input data; FIFO memory for dividing the data in the memory buffer into data amount corresponding to one scanning of the rotary head and storing it; data compressing or extending circuits for compressing or extending data in the FIFO memory and transferring it to the rotary head in response to a running speed of the tape; rotary head slant control circuits for controlling a slant amount of the rotary head in such a way that it may form a slant track having the same inclination as that of the slant track formed at a standard speed in response to the running speed of the tape running speed; data read-out phase control circuits for controlling a data read-out phase in the FIFO memory in response to the tape running speed; and a rotary head displacement control circuits for controlling an amount of offset of displacement of the rotary head in response to the recording phase.

4 Claims, 7 Drawing Sheets

DATA RECORDING DEVICE

BACKGROUND OF THE INVENTION

1. Field of the Invention

This invention relates to a data recording device using a video tape recording device, and more particularly, a data recording device in which data can be recorded at an optional speed.

2. Description of the Prior Art

In a usual helical scanning magnetic tape recording and reproducing device such as a VTR or the like, a recording is carried out at a specified normal speed during its recording operation. Further, in the case that a reproducing operation is carried out, a dynamic tracking technology or the like is applied to enable a noiseless reproduction to be realized from a stand-still state to a speed of several times of a normal speed.

In the general type of VTR, it is assumed that an amount of data per unit time of an image signal (30 frames in one second) is kept constant and the data is continuously processed without the need to record the data at a special tape speed.

As an exceptional case of a monitoring (surveying) VTR, an input image signal is recorded in drawing out data like one in which only one frame is left in an interval of 1 second, for example. In addition, an optional speed recording VTR enabling a frame-based photographing and a slow-speed recording to be carried out or a super-motion VTR capable of recording three times a normal input image signal are already products in the market.

However, in no case, have the existing VTRs realized a function to record all the data in a tape without dropping data inputted at an optional speed including an intermittent input.

Further, in order to fulfill a requirement for a recording operation at more optional speeds, there has been provided a stepless preset speed (provided that once starting the recording operation, no changing of the speed can be performed) and a product such as a variable rate buffer or the like has also been manufactured as a device for handling data in a continuous manner.

When it is assumed that a data recording is carried out as an external memory for a computer, for example, the magnetic tape recording and reproducing device with a helical scanning recording by a rotary head has a longer ready-running period, shows a more hard continuous data processing as compared with that of a longitudinal recording in parallel with a tape running direction in the prior art, and so this type of system has been improper for a data recording operation. However, as an amount of data has been remarkably increased due to an advancement of a processing capability of a computer in recent years, either a high speed helical scanning recording or a high recording density has been noticed and the magnetic tape data recording and reproducing device with the helical scanning recording has been put in the market as a product irrespective of the aforesaid disadvantages.

The usual magnetic tape recording and reproducing device of helical scanning has a disadvantage that a time ranging from a completion of recording to a subsequent continuous recording (stop-start time), i.e. a tape running time from an editing-out time in VTR to a tape stopping, pre-rolling, tape ready-running and an editing-in point (this is adjacent to an editing out point) is long.

The variable rate buffer stores all the inputted data once on a memory irrespective of the fact that this stop start time (no data can be recorded in the tape during this period) is present or the recording is being carried out and when a sufficient amount of data is accumulated, it transfers data in the memory to the tape at a normal speed recording. Then, the recording with respect to the tape is stopped concurrently with a vacant state of the data in the memory and then an operation waiting for the time in which sufficient data is accumulated on the memory is repeated.

In this way, the memory is used as a data buffer, a recording stop/start of the helical scanning magnetic tape recording and reproducing device is controlled concurrently with an on/off control of reading-out operation from the memory to realize a function to cause all the data inputted at an optional speed including an intermittent input to be recorded on a tape without any loss at all.

However, this method requires a semiconductor memory having a large capacity acting as a buffer corresponding to a minimum stop and start time. For example, if it is assumed that the stop/start time is 5 seconds and an inputting data speed is 32 MB/sec, a high speed RAM corresponding to 160 MB is required, resulting in that some severe disadvantages of 1) expensive in price and 2) data loss under a power failure becomes large.

As described above, in order to perform a data recording under a variable rate at the prior art data recording device, a certain degree of data loss is estimated or a memory of corresponding amount for the data to be recorded once on a memory is required, and in the former case, a problem of the data loss and in the latter case, its price or data loss under a power failure has been as a problem.

In view of the foregoing, it is an object of the present invention to realize the data recording device capable of recording data at an optional speed without any data loss by applying a buffer of memory capacity remarkably less than the memory capacity required in the prior art

SUMMARY OF THE INVENTION

In order to attain the aforesaid object, the present invention provides a data recording device in which data is recorded by forming a slant track on a recording medium with a rotary head capable of varying a slant amount and a displacement in a direction substantially crossing with a running direction of said recording medium comprising:

first memory means for temporarily storing input data;

means for detecting a residual amount of data stored in this first memory means;

recording medium speed control means for controlling a running speed of said recording medium in reference to the detected residual amount of data;

recording phase sensing means for sensing a recording phase of said recording medium in response to a control signal recorded in advance on said recording medium;

data compressing or extending means for compressing or extending data of the memory means and transferring it to said rotary head in response to a running speed of said recording medium;

rotary head slant control means for controlling a slant amount of said rotary head in such a way that it may form a slant track having the same inclination as that of the slant track formed on said recording medium running at a standard speed in response to the running speed of the recording medium;

data output phase control means for controlling an output phase of data compressed or extended by said data compression or extending means in response to a recording phase detected by said recording phase sensing means; and rotary head displacement control means for controlling an offset amount of displacement of said rotary head in response to a recording phase detected by said recording phase sensing means.

DESCRIPTION OF THE PREFERRED EMBODIMENT

Referring now to the drawings, the data recording device of the present invention will be described in detail.

Figures 1, 1A:
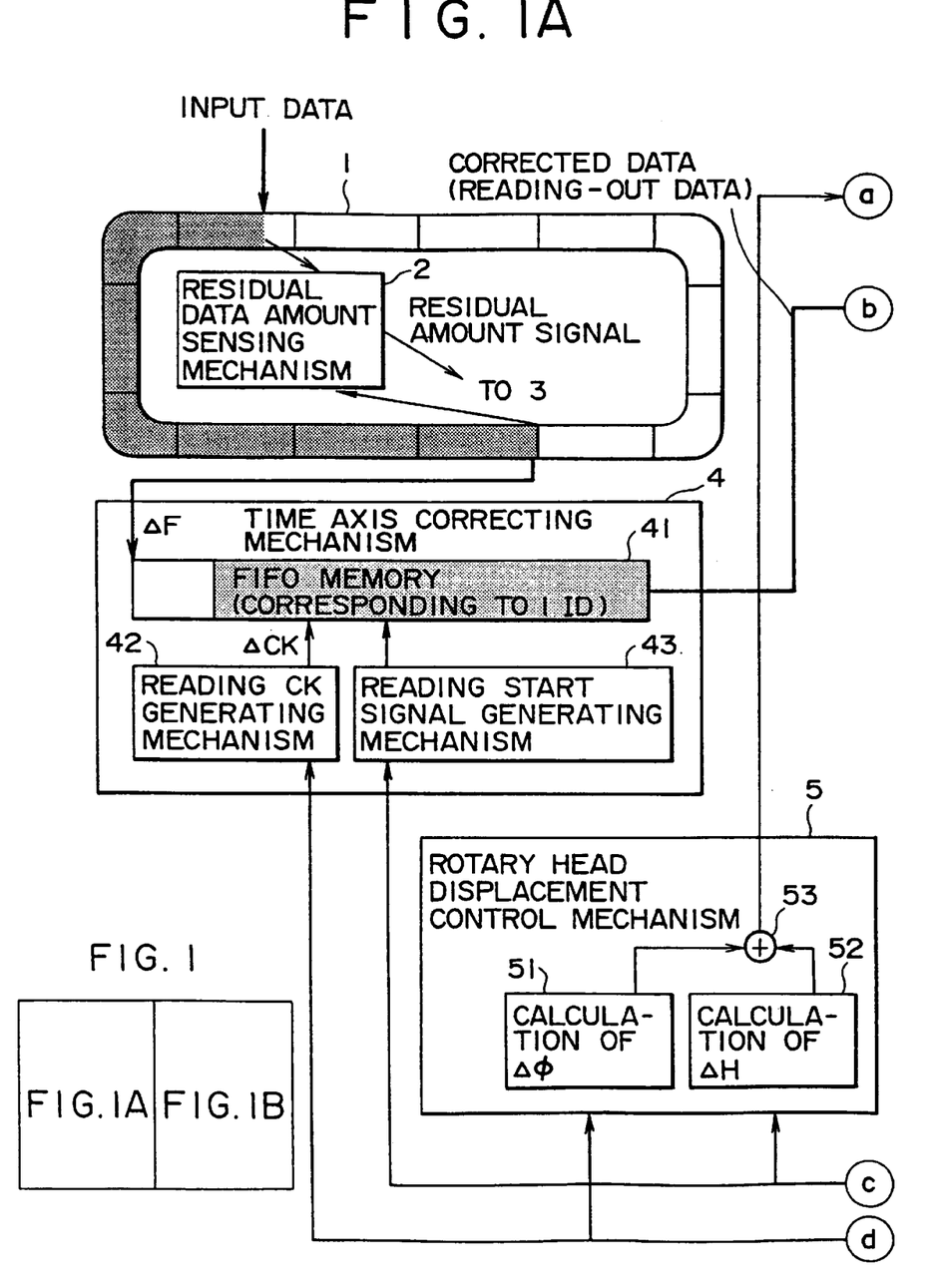
FIGS. 1A–1B are a block diagram for showing one preferred embodiment of the data recording device of the present invention.
Figure 1B:
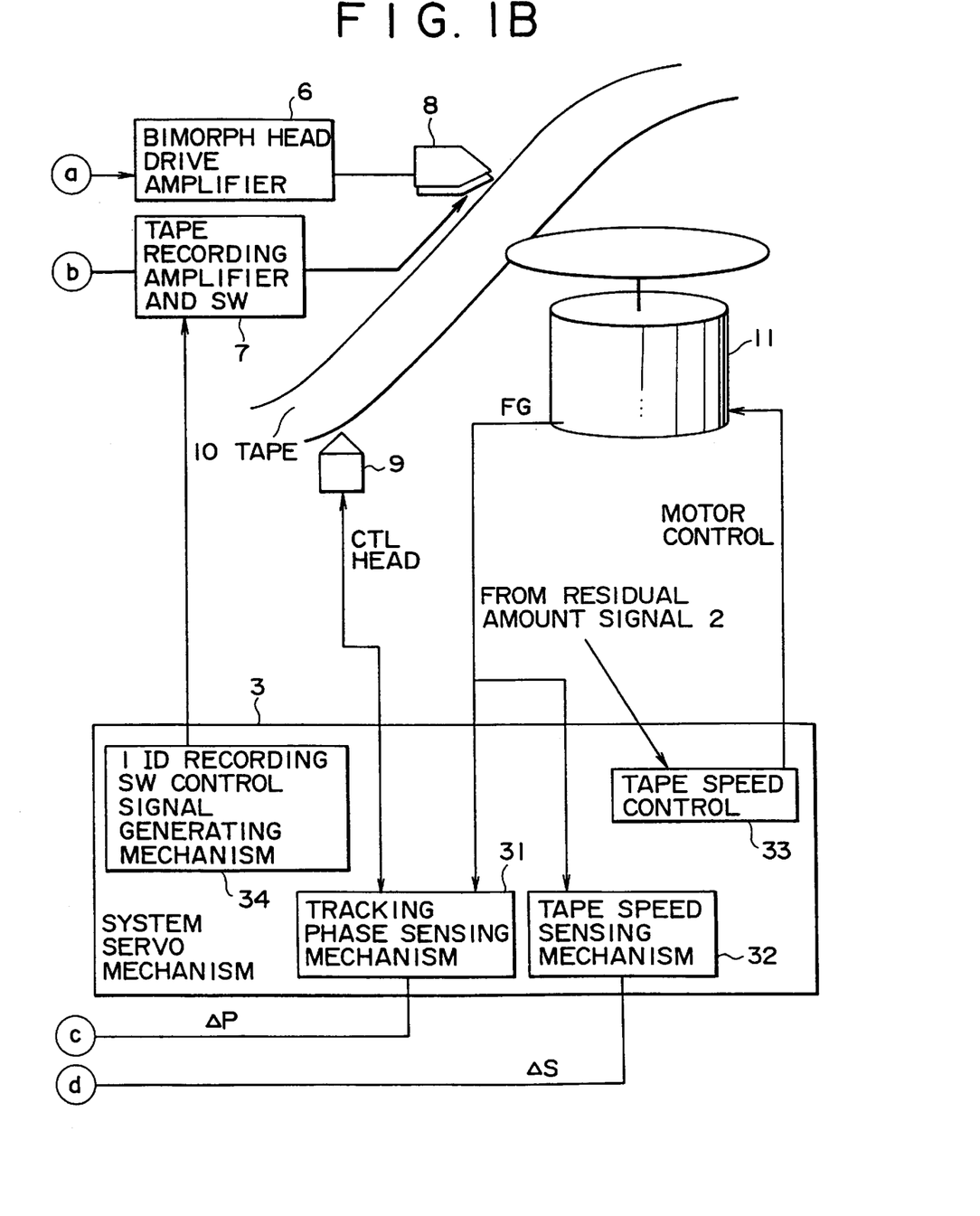

FIG. 1 is a block diagram for showing one preferred embodiment of the data recording device of the present invention.

In FIG. 1, 1 denotes a memory buffer, 2 denotes a data residual amount sensing mechanism, 3 denotes a system servo mechanism, 4 denotes a time axis correcting mechanism, 5 denotes a rotary head displacement control mechanism, 6 denotes a bimorph head driving amplifier, 7 denotes a tape recording amplifier and changing-over switch, 8 denotes a bimorph head, 9 denotes a CTL head, 10 denotes a magnetic tape, and 11 denotes a tape driving motor.

In this recording device, the data inputted to the memory buffer 1 can be processed in the following manner 1) data is sent in a burst form from an SCSI (Small Computer System Interface) bus, PCI (Peripheral Component Interconnect) bus or the like such as when the data is connected to a computer, or 2) continuous data received from a satellite or a communication network or the like, and the processing subsequent to the memory buffer 1 in both cases above is common to each other.

Figure 2:
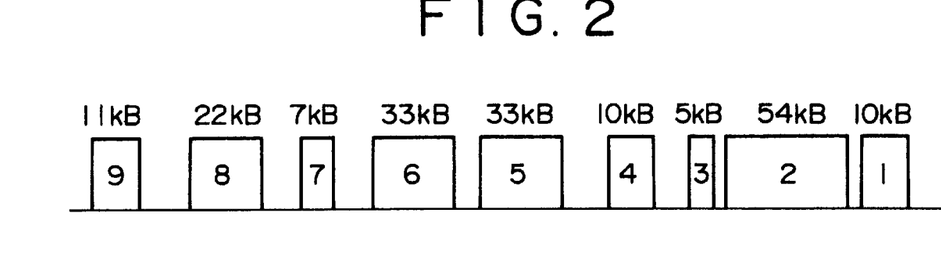
FIG. 2 is a view for showing one example of data format to be inputted.
Figure 3:
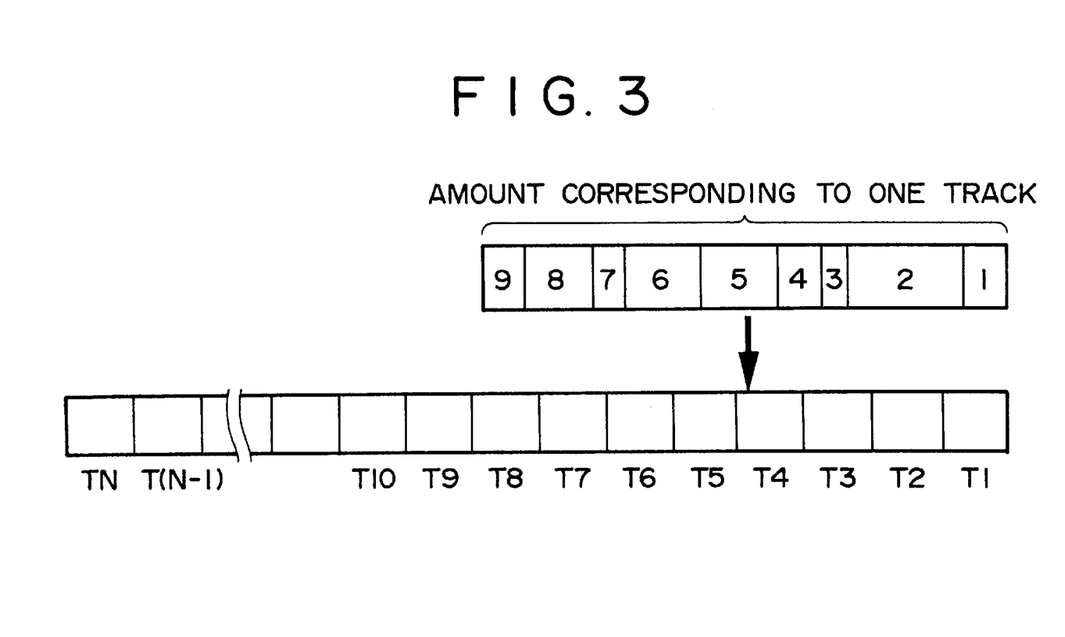
FIG. 3 is a view for showing a data storing format within a memory buffer in the preferred embodiment shown in FIG. 1.

In FIGS. 2 and 3 is indicated the content of processing performed at the memory buffer. This processing method will be described in reference to FIGS. 2 and 3 as well as FIG. 1.

For example, as shown in FIG. 2, the data in a burst form taken in a discontinuous interrupted manner is inputted in sequence into the memory buffer 1, once continuously collected and divided into data corresponding to one track shown in FIG. 3 (this is called as 1 ID hereinafter which corresponds to about 1 MB) and stored in the memory buffer 1 in sequence well. It is satisfactory that the memory capacity in the memory buffer 1 is about 32 MB.

Within this memory buffer 1 is present a data residual amount sensing mechanism 2 for sensing what amount of data of ID corresponds to data to be recorded on a tape 10 is stored in the memory buffer 1, wherein information about the data residual amount obtained in this case is sent to the system servo mechanism 3 for driving the tape.

In the system servo mechanism 3, when the data is accumulated in such an amount corresponding to 1 ID, for example, in reference to information about the data residual amount, the data is recorded in the tape 10 while it is kept in still state and the tape speed control section 33 controls the tape driving motor 11 in such a way that when data of several ID are already accumulated, the tape 10 is driven at ¼ slow speed, when data of about 10 ID are already accumulated, the tape 10 is driven at ½ slow speed, and when data more than that are accumulated, the tape 10 is driven at a normal speed so as to record the data, respectively. In addition, even if the tape 10 is running, the tape residual amount sensing mechanism 2 controls in such a way that it always monitors the data residual amount in the memory buffer 1 and when the data residual amount is increased, it speeds up the tape speed and in turn when the data residual amount is decreased, it decreases the tape speed and if the value becomes less than 1 ID, it stops the tape.

Figure 5:
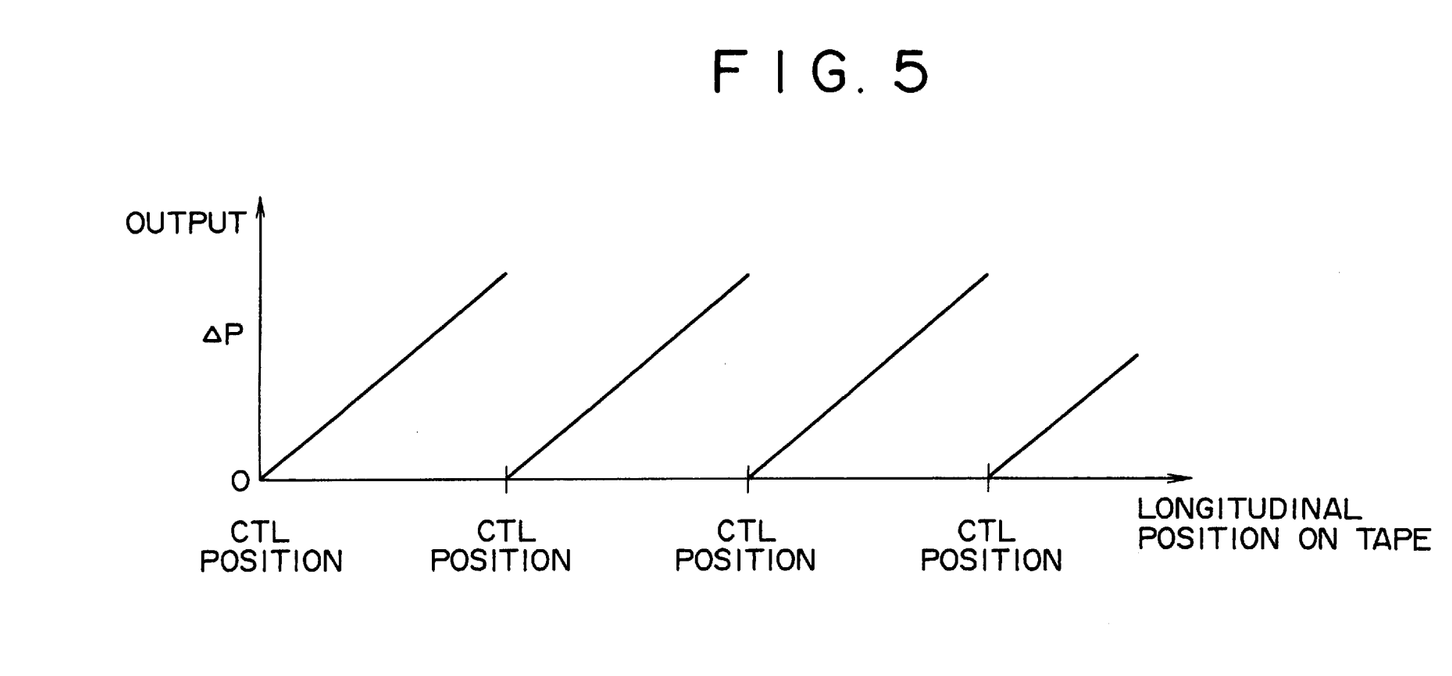
FIG. 5 is a view for showing an output of a tracking phase sensing mechanism in the preferred embodiment shown in FIG. 1.

Data in the memory buffer 1 is transferred to and written into the memory 41 of a time axis correcting mechanism 4 in a unit of 1 ID, a displacement amount $\Delta P$ proportional to a phase displacement from a helical track standard writing phase, i.e. a phase of a control (CTL) signal as shown in FIG. 5 is obtained as information from the tracking phase sensing mechanism 31 within the system servo mechanism 3, a starting of reading operation is shifted in relation with time by the reading operation start signal generating mechanism 43 and then the information is read out of the FIFO memory 41 in the time axis correcting mechanism 4.

This time shifting amount is equivalent to the data recording positional correction of the helical track pattern where data is recorded on the tape with a rotary head and so there is a proportional relation between the time shift amount $\Delta T$ and a phase displacement amount $\Delta P$.

Figure 6:
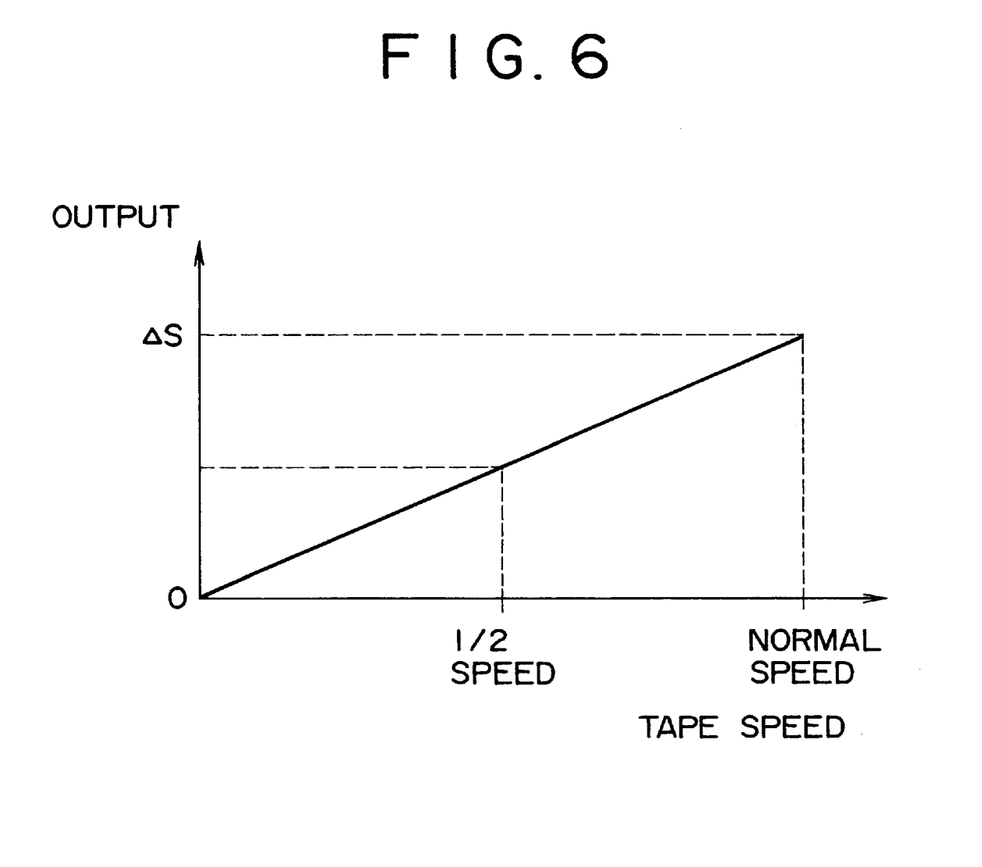
FIG. 6 is a view for showing an output of a tape speed sensing mechanism in the preferred embodiment shown in FIG. 1.

In addition, a reading-out clock corresponding to a running speed is generated by a reading-out clock generating mechanism 42 in the time axis correcting mechanism 4 on the basis of a tape speed information $\Delta S$ shown in FIG. 6 obtained by the tape speed sensing mechanism 32 of the system servo mechanism 3. This clock is a clock frequency $\Delta CK$ in which a data frequency $\Delta F$ when it is recorded at a normal speed is corrected by a varying amount of relative speed of the tape, wherein the data is read out of the FIFO memory 41 in the time axis correcting mechanism 4 with the corrected clock frequency $\Delta CK$ and sent to a tape recording system. In this case, a frequency varying amount $(\Delta F - \Delta CK)$ of the clock is proportional to $(1-n)$, where n is a double speed value, n=0 at a still and n=1 at a normal speed.

Figure 4:
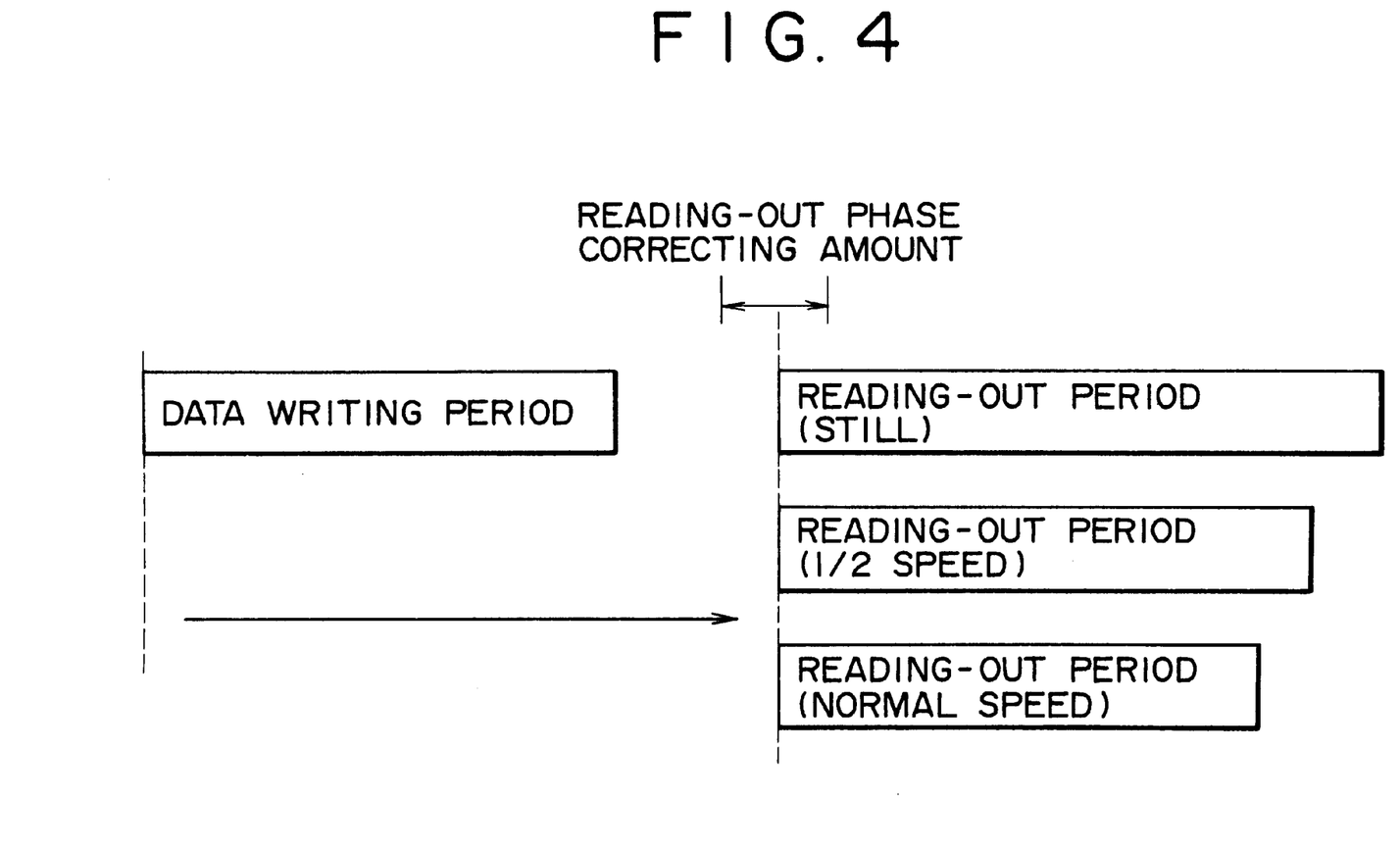
FIG. 4 is a view for showing an example of writing and reading-out of data at a time axis correction mechanism in the preferred embodiment shown in FIG. 1.

With such an arrangement as above, the data once recorded in the FIFO memory 41 in the time axis correcting mechanism 4 is corrected for its reading-out phase in response to a data recording position of the helical track pattern and then it is compressed or extended in response to a tape running speed (refer to FIG. 4).

In turn, the data recording system is comprised of a bimorph rotary head 8 for recording data fixed on a voltage displacement element such as a bimorph element or the like, a bimorph rotary head driving amplifier 6 for driving it and a rotary head displacement control mechanism 5. At the rotary head displacement control mechanism 5, a helical track writing height correction ΔH defined in a phase relation with the control (CTL) signal and a head slant correction ΔΦ from the state of stopped tape to the normal speed are carried out by ΔH calculating mechanism 52, ΔΦ calculating mechanism 51 and the adder 53.

The helical track writing height correction ΔH is a value in which it is corrected by applying the rotary head displacement control mechanism 5 in such a way that it may become a height of the helical track pattern equivalent to that of a case in which it is recorded at a normal speed on the basis of a displacement amount ΔP from a helical track standard writing phase (CTL signal phase) obtained as information from the tracking phase sensing mechanism 31, and it can have a proportional relation with ΔP.

In addition, the head slant correction ΔΦ becomes a maximum slant correction value when the tape is stopped (still) and this value is a difference between a so-called normal angle and a still angle. In addition, in the case that the tape is running at a normal speed, an angle correcting amount is 0.

Figure 7A:
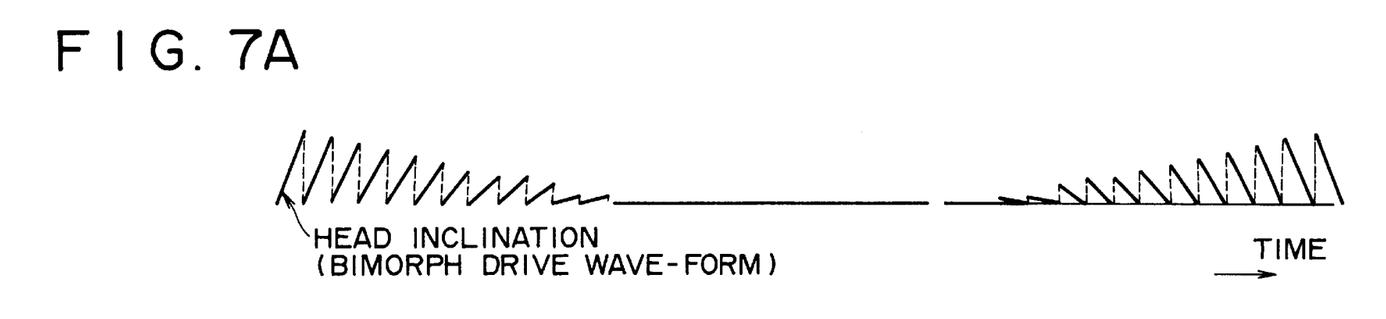
FIGS. 7A and 7B shows a relation between a tape speed and a head inclination correcting amount.
Figure 7B:
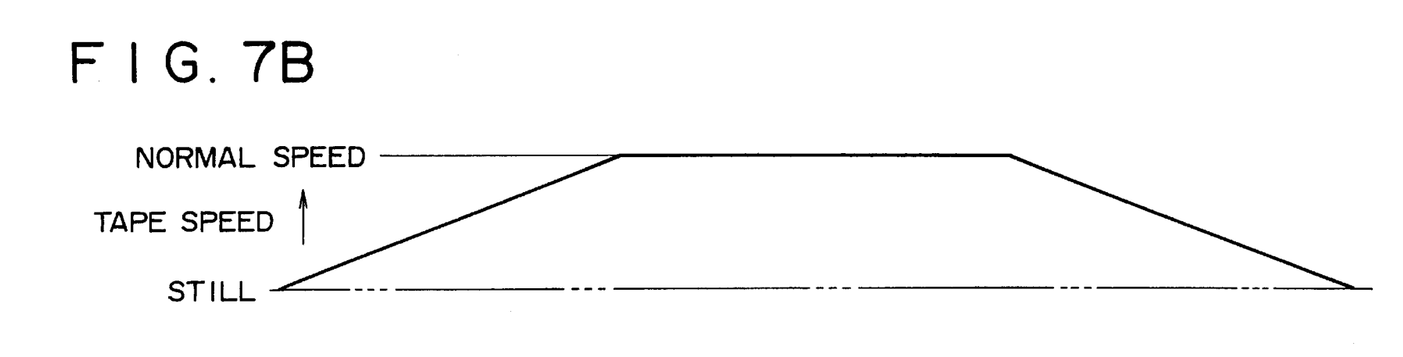

As shown in FIG. 7A, the tape speed is increased from a still state to the normal speed as the time elapses, thereafter, when it is returned back to the still state, the head slant is changed from the normal state as shown in FIG. 7A.

This head slant correction value ΔΦ is calculated on the basis of the tape speed information ΔS shown in FIG. 6 obtained by the tape speed sensing mechanism 32, $$\Delta\Phi = \Delta S (1-n)$$

where, n is a double speed value, n=0 for a still state and n=1 for a normal state.

With such an arrangement as above, the bimorph rotary head 8 is set such that the writing height is corrected in response to the data recording position of the helical track pattern, the head slant angle is corrected in response to the tape running speed, where the slant track having the same inclination as that of the slant track recorded on the tape always running at a standard speed is formed continuously.

In the Japanese Patent Publication No. Hei 07-57022 is disclosed the fact that the video signal is recorded by the bimorph rotary head at an optional tape speed while a Fleming's continuity characteristic is being kept. Refer to this document about the bimorph rotary head.

As described above, in accordance with the present invention, it is possible to realize the device capable of recording a data i.e. the helical track pattern equivalent to the case that it is recorded at a normal speed on the tape without having any waiting time in response to the amount of data accumulated in the memory buffer 1 from the state in which the tape is stopped to the normal speed.

As described above, the present invention provides a data recording device in which data is recorded by forming a slant track on a recording medium with a rotary head capable of varying a slant amount and a displacement in a direction substantially crossing with a running direction of the recording medium characterized in that it is comprised of a first memory means for temporarily storing input data; a recording medium speed sensing means for detecting a running speed of the recording medium; recording phase sensing means for sensing a recording phase of the recording medium in response to a control signal recorded in advance on the recording medium; a second memory means for dividing the data stored in a first memory means for every data amount corresponding to one scanning of the rotary head and storing it; data compressing or extending means for compressing or extending data in the second memory means and transferring it to the rotary head in response to a running speed of the recording medium detected by the recording medium running speed sensing means; rotary head slant control means for controlling a slant amount of the rotary head in such a way that it may form a slant track having the same inclination as that of the slant track formed on the recording medium running at a standard speed in response to the running speed of the recording medium detected by the recording medium running speed sensing means; data read-out phase control means for controlling a read-out phase of data in the second memory means compressed or extended by the data compression or extending means in response to a recording phase detected by the recording phase sensing means; and a rotary head displacement control means for controlling an offset amount of displacement of the rotary head in response to a recording phase detected by the recording phase sensing means.

With such an arrangement as above, a large amount of memory corresponding to a ready-running period required by the prior art helical scanning magnetic tape recording or reproducing device is not required, it becomes possible to perform data recording at an optional speed without any loss of data by applying a buffer of a memory capacity which is substantially less than the memory amount required in the prior art (for example, about ⅓). Accordingly, the device can be realized in a less-expensive manner. In addition, an instant recording in the case that the tape running which was impossible in the magnetic tape recording or reproducing device for the fixed head becomes possible.

The present invention is also characterized in that the same is comprised of a data amount sensing means for sensing a data amount stored in the first memory means and a recording medium running speed control means for running a running speed of the recording medium at a standard speed or at an optional speed slower than the standard speed in reference to the amount of data detected by the data amount sensing means.

With such an arrangement as above, the recording can be carried out at an optional speed corresponding to the amount of data stored in the buffer memory and the data recording can be performed without any data loss from the initial running state.

The present invention is further characterized in that the same is comprised of a data transfer control means for controlling a starting and a completion of data writing from the first memory means to the second memory means in reference to the data amount detected by the data amount sensing means; and a data transfer time control means for controlling a transfer time of the rotary head of data in the second memory means compressed or extended by the data compressing or extending means in response to the recording phase detected by the recording phase sensing means.

With such an arrangement as above, the data transfer can be smoothly realized and the data recording can be performed from the initial running state without any loss of data.

What is claimed is:

1. A data recording device for recording data by forming a slant track on a recording medium with a rotary head adapted to vary a slant amount and an offset displacement amount in a direction substantially crossing a running direction of said recording medium, comprising:

first memory means for temporarily storing input data;

second memory means for storing one track of data:

detecting means for detecting a residual amount of data stored in said first memory means and for producing a residual amount signal;

data transfer means for transferring said one track of data from said first memory means to said second memory means in response to said residual amount signal;

recording medium speed control means for controlling a running speed of said recording medium in response to said residual amount signal from said detecting means;

recording phase sensing means for sensing a recording phase of said recording medium in response to a pre-recorded control signal on said recording medium;

data compressing or expanding means for compressing or expanding said one track of data of said second memory means and for transferring said compressed or expanded one track of data to said rotary head in response to said running speed of said recording medium;

rotary head slant control means for controlling said slant amount of said rotary head so that it forms a slant track having an inclination equal to a slant track formed on said recording medium when running at a standard speed in response to said running speed of said recording medium;

data output phase control means for controlling an output phase of said compressed or expanded data by said data compressing or expanding means in response to said recording phase sensed by said recording phase sensing means; and rotary head displacement control means for controlling said offset displacement amount of said rotary head in response to said recording phase sensed by said recording phase sensing means.

2. The data recording device according to claim 1, wherein said data compressing or expanding means outputs said one track of data from said second memory means at a clock rate corresponding to said running speed of said recording medium, and said data output phase control means controls an output phase of said data from said second memory means in response to said recording phase sensed by said recording phase sensing means.

3. The data recording device according to claim 1, wherein said recording medium speed control means controls said running speed of said recording medium so that said residual amount of data detected by said detecting means falls within a predetermined range.

4. The data recording device according to claim 1, wherein said second memory means is a FIFO memory.

* * * * *